(12) United States Patent
Abramoff

(10) Patent No.: US 12,440,149 B2
(45) Date of Patent: Oct. 14, 2025

(54) TOOTH DECAY DIAGNOSTICS USING ARTIFICIAL INTELLIGENCE

(71) Applicant: Digital Diagnostics Inc., Coralville, IA (US)

(72) Inventor: Michael D. Abramoff, University Heights, IA (US)

(73) Assignee: Digital Diagnostics Inc., Coralville, IA (US)

(*) Notice: Subject to any disclaimer, the term of this patent is extended or adjusted under 35 U.S.C. 154(b) by 405 days.

(21) Appl. No.: 18/083,247

(22) Filed: Dec. 16, 2022

(65) Prior Publication Data

US 2023/0190182 A1 Jun. 22, 2023

Related U.S. Application Data

(60) Provisional application No. 63/291,216, filed on Dec. 17, 2021.

(51) Int. Cl.
*A61B 5/00* (2006.01)
*G06T 7/00* (2017.01)

(52) U.S. Cl.
CPC .......... *A61B 5/4547* (2013.01); *G06T 7/0016* (2013.01); *G06T 2207/10024* (2013.01); *G06T 2207/10101* (2013.01); *G06T 2207/20081* (2013.01); *G06T 2207/30036* (2013.01)

(58) Field of Classification Search
CPC ... A61B 5/4547; A61B 5/7264; A61B 5/0066; A61B 5/7267; A61B 5/0088; G06T 7/0016; G06T 2207/10024; G06T 2207/10101; G06T 2207/20081; G06T 2207/30036; G06T 2207/20084
USPC ........................................................ 382/131
See application file for complete search history.

(56) References Cited

U.S. PATENT DOCUMENTS

| | | | | |
|---|---|---|---|---|
| 11,883,132 | B2* | 1/2024 | Seibel et al. | A61B 5/0088 |
| 2006/0223032 | A1* | 10/2006 | Fried et al. | A61C 5/00 |
| | | | | 433/215 |
| 2015/0216398 | A1 | 8/2015 | Yang et al. | |
| 2018/0028063 | A1 | 2/2018 | Elbaz et al. | |
| 2019/0117078 | A1* | 4/2019 | Sharma et al. | A61B 5/0088 |
| 2020/0037930 | A1* | 2/2020 | Abramoff et al. | A61B 5/121 |
| 2021/0142885 | A1 | 5/2021 | Ricci et al. | |
| 2021/0353216 | A1* | 11/2021 | Hillen | A61B 5/4547 |
| 2023/0238078 | A1* | 7/2023 | Gonzalez et al. | G16B 20/00 |

OTHER PUBLICATIONS

PCT International Search Report and Written Opinion, PCT Application No. PCT/US2022/053189, Mar. 14, 2023, 10 pages.

* cited by examiner

*Primary Examiner* — Matthew C Bella
*Assistant Examiner* — Daniel Joseph Santos
(74) *Attorney, Agent, or Firm* — Fenwick & West LLP

(57) ABSTRACT

A device is disclosed for diagnosing a dental condition. The device captures image data representative of a tooth of a patient based on data obtained from a hardware device that scans the tooth. The device inputs the image data into a first supervised machine learning model, and receives, as output from the first supervised machine learning model, a plurality of biomarkers, each biomarker corresponding to a different location of the tooth. The device inputs the plurality of biomarkers into a second supervised machine learning model, and receives, as output from the second supervised machine learning model, a diagnosis of a dental condition.

11 Claims, 5 Drawing Sheets

TOOTH DECAY DIAGNOSTICS USING ARTIFICIAL INTELLIGENCE

CROSS REFERENCE TO RELATED APPLICATIONS

This application claims the benefit of U.S. Provisional Application No. 63/291,216 filed on Dec. 17, 2021. The content of which is incorporated herein by reference in its entirety.

BACKGROUND

The risk of tooth decay (dental caries) is pervasive across society, and any human is subject to risk of tooth decay, especially with diets rich in carbohydrates and ultra-processed food. Tooth decay is a major source of disability, suffering and healthcare costs. Effective treatments to halt and reverse tooth decay exist, especially where it is caught in early stages, when it is still symptomless. However, adherence to early diagnosis, where the standard of care is dental examination by a dentist, is suboptimal, leading to unnecessarily advanced tooth disease. While standard of care dental examination by a dentist and additionally x-ray is effective in early diagnosis of tooth decay, scaling this is a challenge, because of the need for and lack of either highly skilled specialists (i.e. dentists), or highly skilled X-ray technicians, with requirements that vary highly per state, as well as the exposure to X_rays that may have long term health effects, in addition to the need for evaluation by specialists through some form of telemedicine, which leads to relatively high cost and diminishes access.

SUMMARY

Therefore, an autonomous tooth screening artificial intelligence (AI) technique that a) does not require X-rays and b) does not require experts for evaluating the images is highly advantageous for increasing access, lowering cost, and thereby avoiding permanent disability and cost. Specifically, Deep penetration Optical Coherence Tomography (DPOCT) is a radiationless, optical technique, based on interferograms of low coherence light, to penetrate up to 4-5 mm into a tooth element, including molars, which allows all faces of each element to be imaged, including any cavities on all faces. Especially, it allows so-called interproximal cavities, between two elements, to be imaged, which is where 60% of cavities occur, and which is not accessible to visual inspection, and autonomous AI is a technology that allows real time, point of care diagnosis of cavities from multiplanar DPOCT images.

As DPOCT may not penetrate through the entire tooth, especially larger molars, imaging of each accessible surface may be required. This may be achieved through multiplanar DPOCT, with a small probe or multiple probes that covers at least the facial, lingual, and occlusional surfaces of a row of molars, through three or more parallel fiberoptics to illuminate with low coherence light and collect the reflected low coherence light to a DPOCT device which calculates the interference images, using a Michelsons interferometry approach for each plane in a so-called swept source or domain OCT interferogram which allows fast scanning of the entire element. It obtains one or more B-scans (2 dimensional scans) from these three planes coaxially with the probe, and as the probe is manually, or with servos, advanced back and forth multiplanar 3D PDOCT volumes are collected. In one instance, the probe is applied to the other three rows of molars, completing the multi-dimensional imaging of all molar elements in the patient.

The autonomous AI has as inputs the multi-dimensional DPOCT volumes, and outputs either a likelihood of, or a diagnostic dichotomous or multilevel presence or absence, or severity of cavities in the volume. Other diagnostically relevant outputs may also be performed. The AI can be built as a hybrid, partially independent biomarker multidetector AI, with a fusion stage, or as a an multi-image based convolutional neural network using deep learning, shallow learning, recursive networks, all familiar to those known in the art, or any combinations of such AI designs. Exemplary AI of this manner is disclosed in further detail in commonly-owned U.S. Pat. No. 10,115,194, issued Oct. 30, 2018, the disclosure of which is hereby incorporated by reference herein in its entirety. Augmentation and transfer learning approaches including unsupervised transfer learning can be used as well. DPOCT training images labelled with the presence, absence or location, or likelihood or probability of cavities can be used to train such an AI system, or in the case of multi-detector based approaches, image samples that have been labelled can be used to train the detectors, or mathematical descriptions of biomarkers can be used for designing said detectors. DPOCT is merely exemplary, and any other form of imaging that captures the functionality described herein with respect to DPOCT (e.g., using either low coherence light, sound, vibration, or any other waveform generating technique that uses interferometry interference technique) applies equally wherever DPOCT or any other imaging technique is mentioned. Moreover, any Low Coherence Tomography (LCT) technique also equally applies wherever DPOCT is mentioned herein, including ultraviolet, infrared, Dental Penetration or Deep Penetration Optical Coherence Tomography, microwave, optical visible light LCT, ultrasound imaging techniques, and so on.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION (a) Overview

Figure 1:
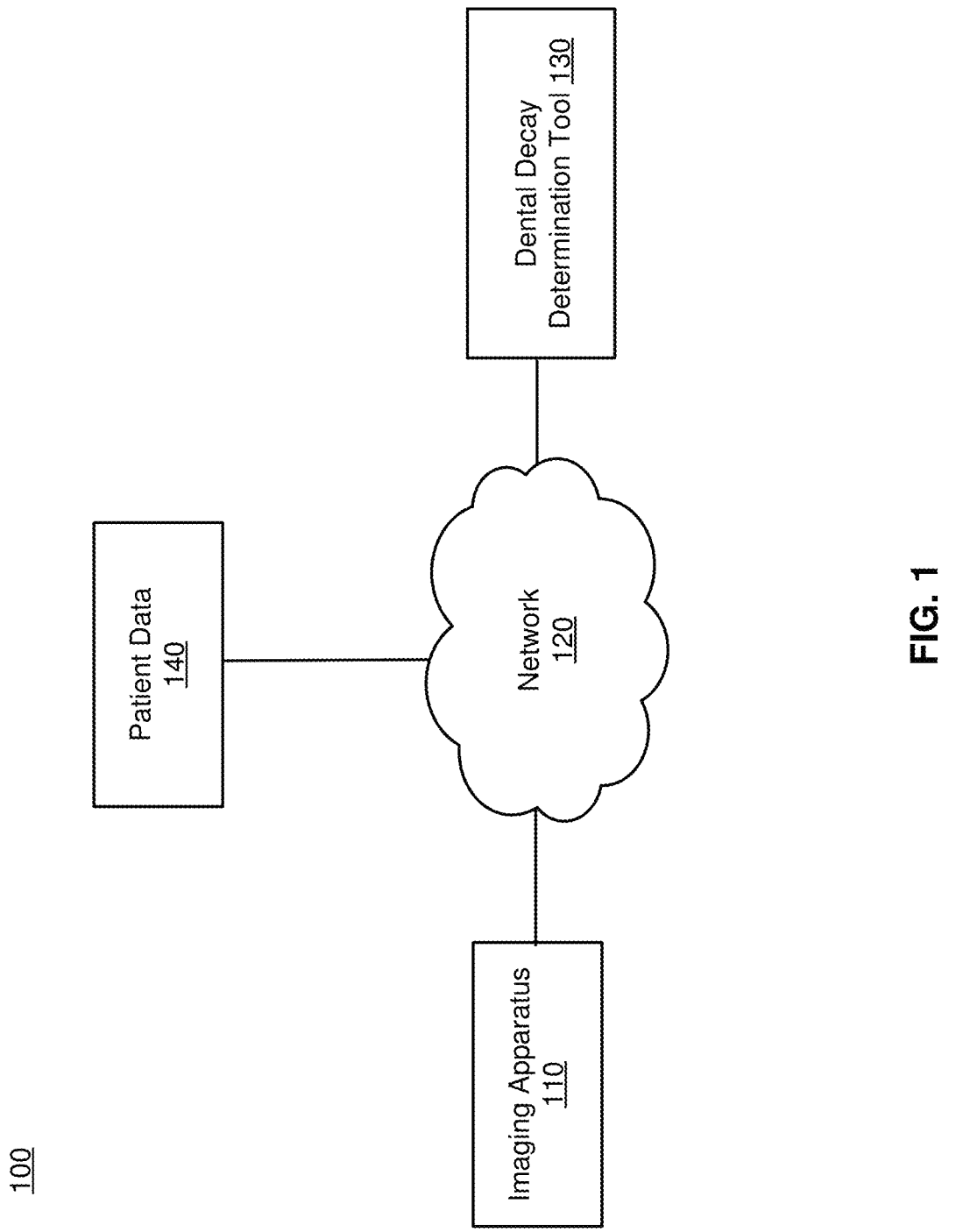
FIG. 1 illustrates one embodiment of a system environment for implementing a dental decay determination tool.

FIG. 1 illustrates one embodiment of a system environment for implementing a dental decay determination tool. As depicted in FIG. 1, environment 100 includes imaging apparatus 110, network 120, dental decay determination tool 130, and patient data 140. The elements of environment 100 are merely exemplary; fewer or more elements may be incorporated into environment 100 to achieve the functionality disclosed herein.

Imaging apparatus 110 may be any apparatus that captures images of a patient's teeth. Imaging apparatus 110 may include camera sensors, DPOCT sensors, and any other long-wave sensors that can capture tooth matter and indicia of tooth decay. Imaging apparatus 110 may accept credentials and other information about a patient. These may be input through a user interface by a technician, or directly by a patient. That is, imaging apparatus 110 may include a keyboard or touchscreen interface for inputting data about a patient, and may additionally include one or more imaging components that capture the images. The imaging components may be any known imaging component (e.g., a slider to be glided over and around teeth by a technician). Imaging apparatus 110 may capture images and prompt for patient information based on running software controlled by or otherwise distributed by dental decay determination tool 130. Because imaging apparatus 110 uses non-x-ray technology, it is operable by a person without a license to operate x-ray equipment (e.g., a technician with minimal training and a high school education), thus enabling scalability of tooth decay detection.

Imaging apparatus 110 may use multiplanar OCT technology in addition to DPOCT sensors. For example, because DPOCT cannot penetrate some teeth completely, multiplanar OCT may be used to capture images showing tooth decay that DPOCT may be unable to capture. The imaging apparatus 110 may use multiplanar OCT to simultaneously or serially measure capture images (e.g., 2D images), and to convert these images into a 3D or other multivolume measurement of any parameter representative of tooth decay (or lack thereof) in any given point of the tooth. The AI disclosed herein may process multiple 3D volumes or other multivolumes captured in this manner together. For example, where multiple teeth or multiple sections of a teeth are scanned together, 3D or other multivolume images may be captured of those multiple teeth and/or multiple sections and may be processed in consideration of one another, given that information in adjacent volumes may constrain one another (e.g., by occlusion).

Network 120 may be any data network capable of transmitting data communications between client device 110 and treatment determination tool 130. Network 120 may be, for example, the Internet, a local area network, a wide area network, or any other network.

Dental decay determination tool 130 receives and processes images from imaging apparatus 110. Dental decay determination tool 130 may also receive other patient information from imaging apparatus 110, and may retrieve information from patient data 140 about the patient. On the basis of some or all received information, dental decay determination tool 130 may output a condition of the patient. Further details of the operation of dental decay determination tool 130 are discussed below with reference to FIG. 2. Operations of treatment determination tool 130 may be instantiated in whole or in part on imaging apparatus 110 (e.g., through an application installed on imaging apparatus 110 or accessed by imaging apparatus 110 through a browser).

Patient data 140 is a database that houses records of data of one or more patients. Patient data 140 may be hospital records, personal records of a patient, doctors notes, and so on. Patient data 140 may be co-located at imaging apparatus 110 and/or at dental decay determination tool 130. In an exemplary embodiment, patient data 140 includes profile information about the patient (e.g., age, gender, race, etc.), prior images captured by imaging apparatus 110 of the patient's teeth (if any), and prior conditions detected by dental decay determination tool 130 (if any). Patient data 140 may integrate with a dentist's office, where a dentist may indicate, on a visit prompted by a condition identified by dental decay determination tool 130, an intervention (e.g., a cavity was filled) or a decision that there was no need for intervention (e.g., false positive). Patient data 140 may be used as a baseline to detect progression of dental decay as images of a patient's teeth are captured over time. Patient data 140 may be used to re-train machine learning models used by dental decay determination tool 130 (e.g., to re-label training data as indicative of not corresponding to a decay condition where a false positive is indicated by a dentist). In an embodiment, use of patient data 140 is optional (e.g., where patient data 140 may include noise that reduces accuracy or other performance of the AI models)

Figure 2:
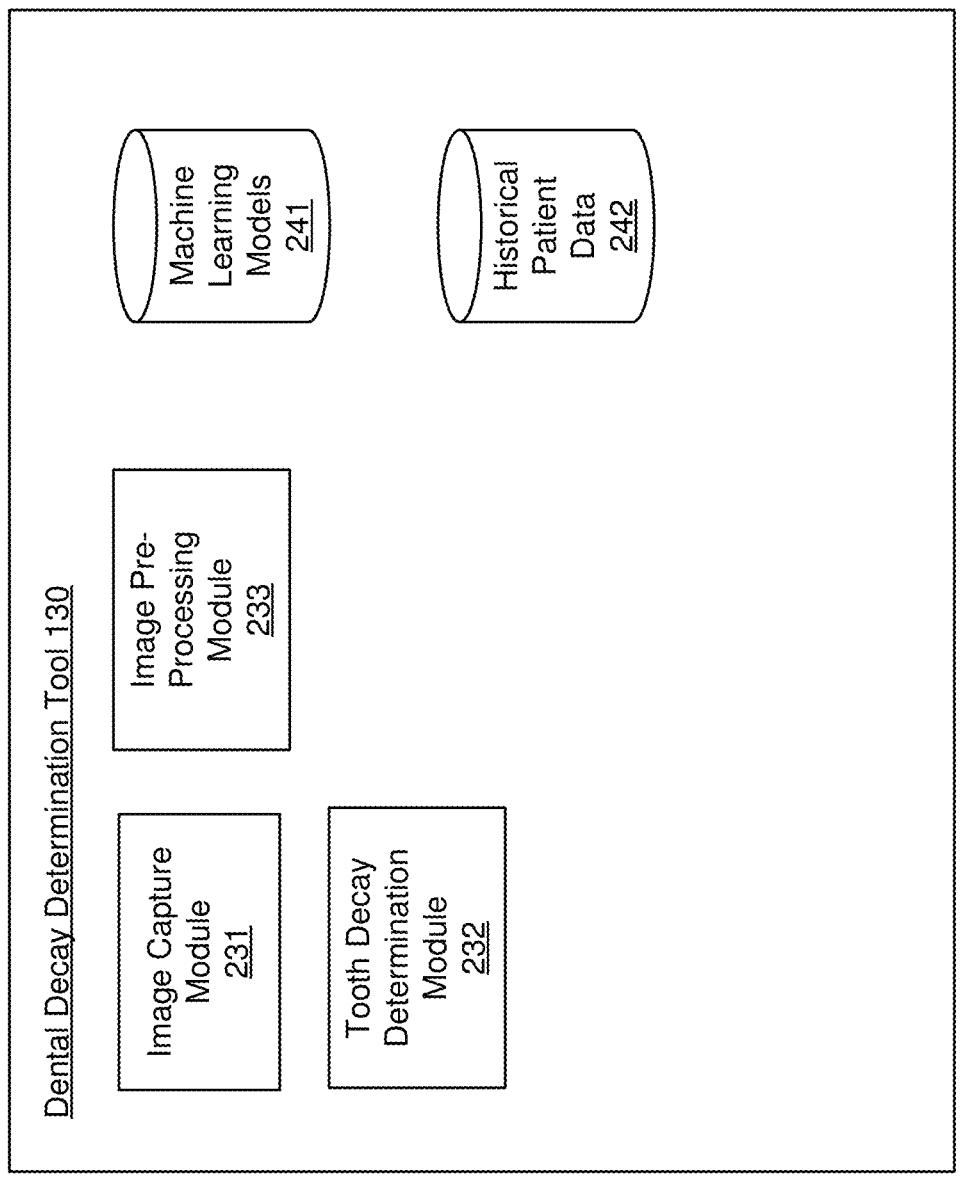
FIG. 2 illustrates one embodiment of exemplary modules and databases used by the treatment determination tool in using artificial intelligence to directly output a treatment.

FIG. 2 illustrates one embodiment of exemplary modules and databases used by the dental decay determination tool in using artificial intelligence to output a dental condition. As depicted in FIG. 2, dental decay determination tool 130 includes image capture module 231, tooth decay determination module 232, and image pre-processing module 233, as well as machine learning models 241. The modules and databases depicted in FIG. 2 are merely exemplary; dental decay determination tool 130 may include more or fewer modules and/or databases and still achieve the functionality described herein. Moreover, the modules and/or databases of treatment determination tool 130 may be instantiated in whole, or in part, on client device 110 and/or one or more servers.

Image capture module 231 performs activity relating to causing imaging apparatus 110 to capture information and transmit that information to dental decay determination tool 130 and/or patient data database 140. This activity may include instructing imaging apparatus 110 (e.g., via a locally installed application or via remote instructions) to capture images of a patient's teeth and transmit them to image capture module 231 for processing. Responsive to receiving the images, image capture module 231 may optionally perform a pre-processing on the images (e.g., using image pre-processing module 233). The pre-processing may include optimizing the images, removing artifacts, confirming that the images conform to one or more protocols (e.g., image shows certain teeth that they are supposed to show), and so on.

In an embodiment, image capture module 231 prompts a technician to perform certain activities. For example, a technician may be prompted by image capture module 231 to capture images of certain teeth, gum areas, to slide an instrument to capture images from certain angles, and any other manipulation of an image capturing device. Images captured during operations corresponding to those prompts may be verified through pre-processing protocols that verify the images conform to the protocols, and responsive to them not conforming to the protocols, image capture module 231 may prompt the technician to re-capture such images.

Tooth decay determination module 232 determines, based on the captured images, one or more conditions of the patient. In an embodiment, tooth decay determination module 232 determines the condition to be a binary decision of whether or not the patient might have tooth decay. That is, the output of tooth decay determination module 232 is either that a patient might have tooth decay and should therefore see a dentist, or that the patient does not have tooth decay and therefore need not see a dentist. In another embodiment, tooth decay determination module 232 may output a diagnosis (e.g., top right quadrant incisor has decay through enamel). Additionally or alternatively, tooth decay determination module 232 may output a treatment (e.g., a filling is required on top right quadrant incisor). Further additionally or alternatively, tooth decay determination module 232 may output an urgency of a risk (e.g., binary "urgent" or "not urgent", a graded scale from 1 to 10 that increases proportionally with urgency, or any other means of representation) based on how likely it is within a threshold period of time to become serious (e.g., require filling now, but requires root canal in 1 month). Further additionally or alternatively, tooth decay determination module 232 may output indicia of any risks posed by tooth decay (e.g., gum disease if tooth decay is not treated).

Tooth decay determination module 232 may perform these determinations by using machine learning. In an embodiment, one or more long-wave images (e.g., DPOCT images) are obtained by image capture module 231 and input by tooth decay determination module 232 into a machine learning model. The machine learning model is trained using training data that labels images with one or more conditions (e.g., training images are labeled with indicia of whether seeing a dentist is needed, whether a particular diagnosis exists, urgency, whether a certain treatment is required, risk, and so on). The machine learning model may be a neural network (e.g., a convolutional neural network), a deep learning network, or any other type of machine learning model. The machine learning model may be trained with other auxiliary data, such as profile information of patients as paired with their images, and may accept as input, in addition to the long-wave image, profile data of the given patient. Optical images showing tooth surface, gum surface, and so on may additionally be used as input to the machine learning models, or portions thereof (e.g., bounding polygons of teeth).

Single-model methods may be accurate, but may permit biases. For example, where a captured image includes gum pigment, gum pigment may form a basis for training a model to determine a certain condition. To this end, two machine learning models may be used. The first machine learning model may accept the image as input, and may output a likelihood for each region of a tooth that the tooth contains a certain feature (e.g., decay, staining, a prior filling or sealant or other dental work, and so on), or some other representation of the image (e.g., intensities at each location of the image). A second machine learning model may be trained to take as input a vector of likelihoods (or other representation) for a given tooth or set of teeth, and to output, based on the vector, the condition. This removes the risk of unwanted factors biasing a condition determination. In an embodiment, the vector of likelihoods may be supplemented with auxiliary information, such as visible light imaging of periodontal tissues.

In an embodiment, patient data 140 may be input to the model in conjunction with the long-wave image. For example, a baseline image from a prior imaging may be input, or may be used to identify using image processing a delta between the baseline image and a new image. The delta may be input into the machine learning model(s) to output a disease condition. A machine learning model may be trained using historical data of a same tooth at different times, where intensity differences over time for a given biomarker are labeled to show severity of a condition (e.g., cavity worsening or getting better; staining worsening; etc.).

Figure 3:
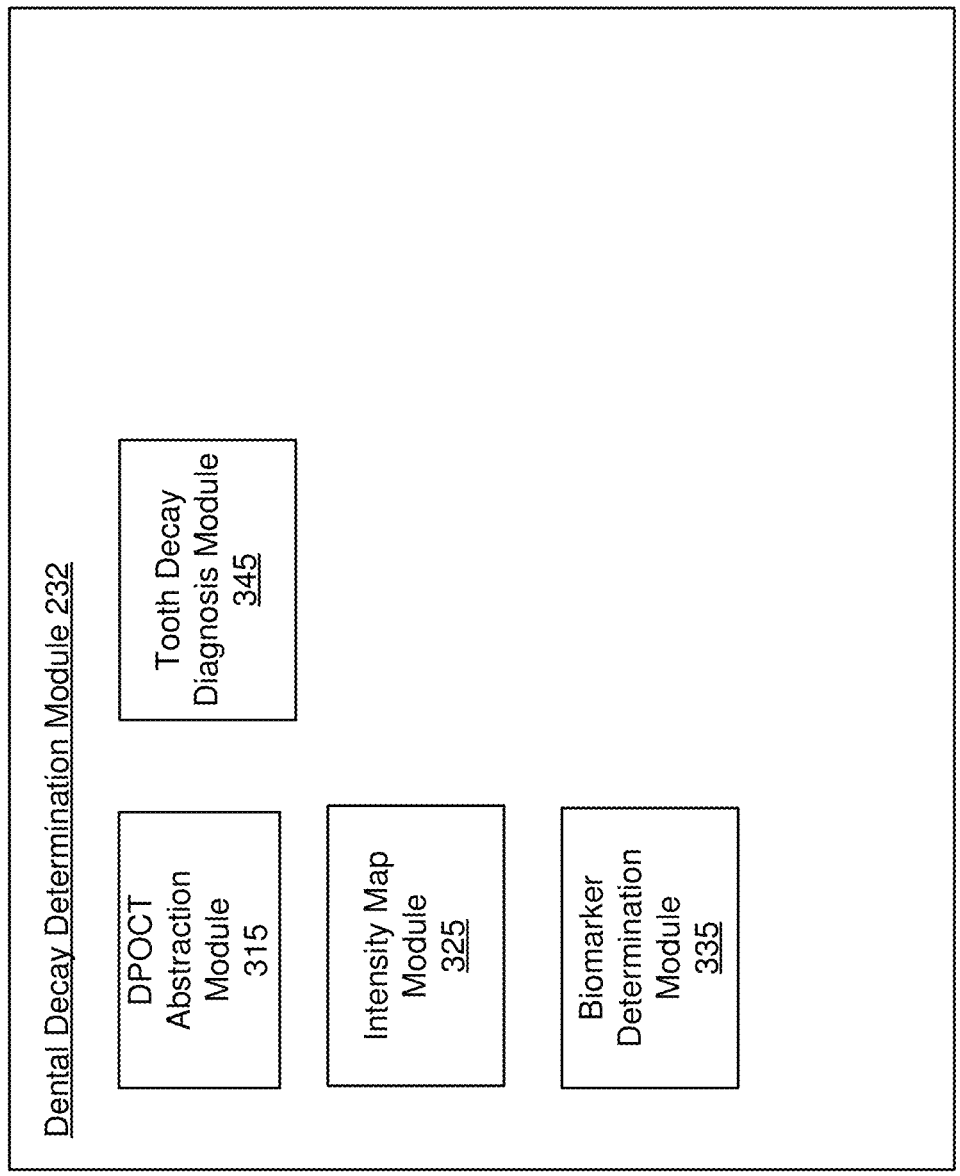
FIG. 3 shows one embodiment of further details of sub-modules used by a dental decay determination module of the treatment determination tool.

FIG. 3 shows one embodiment of further details of sub-modules used by a dental decay determination module of the treatment determination tool. As depicted in FIG. 3, the sub-modules of dental decay determination module 232 may include DPOCT abstraction module 315, intensity map module 325, biomarker determination module 335, and tooth decay diagnosis module 345. Fewer or more modules may be used to achieve the functionality described herein.

As described above, in an embodiment, dental decay determination module 232 inputs an image into the machine learning model. However, additionally, or intentionally, one or more abstractions of a DPOCT image may be input into the machine learning model. An abstraction, as described herein, may refer to a representation of an image. For example, a DPOCT image may include pixels of various intensities. An abstraction may include a delta of intensity difference between neighboring pixels at each region of the image, and the intensity differences may be input into the machine learning model. In an embodiment, DPOCT abstraction module 315 may determine regions where there are at least threshold intensity differences relative to pixels neighboring those regions (e.g., average intensity differences or median intensity differences), and may use a map of those regions as input into the machine learning model. Ground truth training data may exist for any form of abstraction that labels the abstraction. In an embodiment where a single machine learning model is used, the training data may include a label of tooth decay diagnosis that corresponds to the abstraction. In an embodiment where the images are input into a first machine learning model, the abstractions may be labeled with ground truth for any aforementioned output classification.

Intensity map module 325 may generate one or more intensity maps for an image (e.g., a DPOCT image). The intensity maps may indicate, for a given property (e.g., reflectiveness, refractiveness, brightness), an intensity at each pixel of the image of the image. These intensity maps may be used for any purpose (e.g., for abstracting intensity differences, for direct input into a machine learning model, and so on). In general, healthy dental material does not absorb much of a DPOCT scan; however, dental decay or other work (e.g., cavity filling) may absorb relatively more and have a higher intensity. Therefore, ground truth data labeling classifications (e.g., decay, staining, prior fillings) against intensity maps enable a machine learning model to output classifications based on intensity maps.

In an embodiment, intensity map module 325 may determine intensity maps using a delta of intensity between intensity of a current image and of a prior image from patient data 140 (e.g., a difference in intensity of a present image relative to a prior image of the same tooth).

Dental decay determination module 232 may input, alone or together, any of a full color image, a DPOCT image, and any mentioned abstraction into a machine learning model trained to either output diagnoses directly, or trained to output likelihoods for regions of a tooth containing certain features. Where the machine learning model is trained to take two or more of these inputs together, the ground truth data of each type of input is leveraged to best determine relevant classifications.

In an embodiment, biomarker determination module 335 applies heuristics to an intensity map and/or an abstraction showing intensity differences, the heuristics specifying parameters for a size of a region and/or an intensity change for a region to be categorized as a biomarker. These biomarkers may be input into a single machine learning model that outputs based on the biomarkers a diagnosis. In an embodiment where two machine learning models are used, the first machine learning model may be trained to detect the changes in intensity from an intensity map and to output respective classifications for each location in a tooth based on the changes of intensity. Biomarker determination module 335 may determine, from the classifications and optionally other heuristics (e.g., the size of the location) a likelihood that each region having a given intensity change forms a particular type of biomarker (e.g., cavity, prior filling, etc.). Biomarker determination module 335 may compare these likelihoods to prior likelihoods from patient data 140 (e.g., from an image taken in a prior scan in an earlier checkup of the same tooth), and may use the comparisons as input to the second machine learning model. Biomarker determination module 335 may additionally or alternatively annotate biomarkers with intensity differences of the biomarkers from the earlier scan of patient 140 for input to the second machine learning model.

Tooth decay diagnosis module 345 generates a diagnosis for one or more regions of the tooth. In an embodiment, tooth decay diagnosis module 345 determines a diagnosis for each biomarker of the tooth. That is, a machine learning model (a single model, or the second machine learning model in a two model approach) may output probabilities, for either the tooth as a whole or for different biomarkers of the tooth, that the tooth (or biomarker) has one or more conditions (e.g., cavity, prior filling, staining, etc.). Tooth decay diagnosis module 345 may apply thresholding, such that a probability higher than a minimum threshold leads to tooth decay diagnosis module 345 determines that the corresponding condition applies as a diagnosis. Therefore, a tooth with three biomarkers, one for cavity, one for prior filling, and one for staining may have each of those biomarkers individually diagnosed in connection with its location on the tooth. Alternatively, the tooth may be outwardly labeled as having each of those three conditions, without labeling the different areas of the tooth accordingly. Finally, tooth decay diagnosis module 345 may output an abstraction of the diagnoses. For example, heuristics may apply that indicate whether to classify what is diagnosed as "go see dentist" or "no issues detected". For example, classifications that indicate staining and a prior filling in a tooth may lead to "no issues detected" based on those heuristics, whereas any finding of a cavity or pre-cavity material may lead to a classification of "go see dentist."

Figure 4:
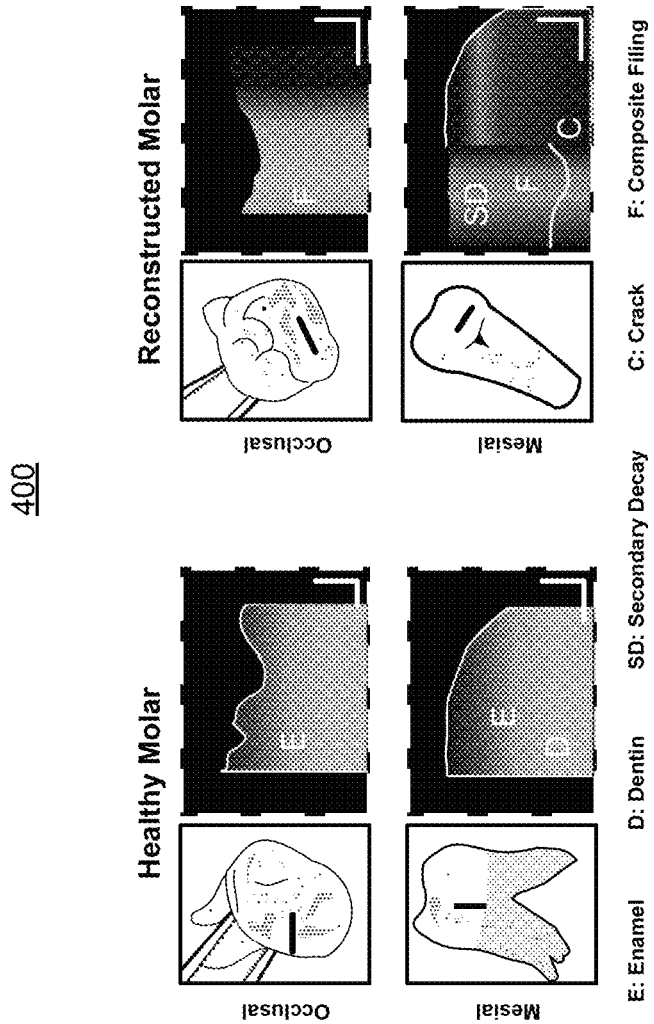
FIG. 4 shows one embodiment of DPOCT intensity maps.

FIG. 4 shows one embodiment of DPOCT intensity maps. As shown in FIG. 4, images 400 show a color image of a tooth, and corresponding intensity maps. These intensity maps may be used as training data, where an expert indicates a label (e.g., enamel, dentin, secondary decay, crack, and composite filling). The labels may be for any type of tooth, such as a healthy molar versus a reconstructed molar. Patient data 140 may be used to determine the type of tooth (e.g., where the patient data 140 indicates that a molar is reconstructed, then the machine learning model fits to ground truth data for reconstructed molars). Different machine learning models may be trained for different tooth types, and dental decay determination module 232 may select the machine learning model that fits the tooth type of a patient as determined from patient data 140 for diagnosing conditions for a given tooth. This may improve efficiency and reduce noise in machine learning model outputs by using a better targeted set of ground truth data.

Figure 5:
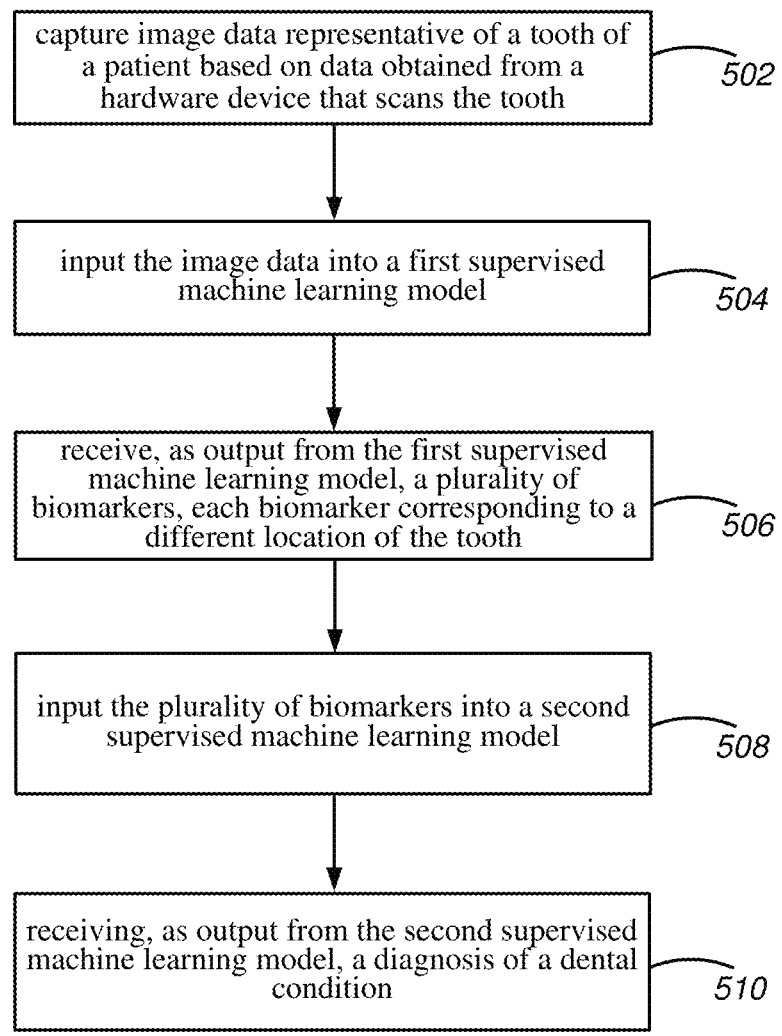
FIG. 5 illustrates an exemplary process for determining a diagnosis of a dental condition using a supervised machine learning approach.

FIG. 5 illustrates an exemplary process for determining a diagnosis of a dental condition using a supervised machine learning approach. As depicted in FIG. 5, process 500 begins with dental decay determination tool 130 capturing 502 image data representative of a tooth of a patient based on data obtained from a hardware device that scans the tooth (e.g., using image capture module 231). In an embodiment, the data obtained from the hardware device that scans the tooth may include Deep Penetration Optical Coherence Tomography (DPOCT) data. The image data may include or may be an intensity map reflective of one or more optical properties of the tooth based on the DPOCT data.

Dental decay determination module 130 inputs 504 the image data into a first supervised machine learning model (e.g., from machine learning models 241). The first supervised machine learning model, in an embodiment, may be trained to detect changes in intensity between regions in the intensity map and to output respective classifications for each different location of the tooth based on the changes in intensity, each respective classification forming a biomarker. In an embodiment, the first supervised machine learning model additionally takes as input a color image of the tooth, may output biomarkers based on both the image and the intensity map.

Dental decay determination module 130 receives 506, as output from the first supervised machine learning model, a plurality of biomarkers, each biomarker corresponding to a different location of the tooth. Where the input included a color image, the output of the first machine learning model may exclude color data from the color image (e.g., to eliminate bias in use of the second machine learning model). Dental decay determination module 130 inputs 508 the plurality of biomarkers into a second supervised machine learning model, and receives 510, as output from the second supervised machine learning model, a diagnosis of a dental condition. In an embodiment, historical biomarkers of the tooth (e.g., from patient data 140 where prior images were taken and determinations were made from the first model and/or the second model) are retrieved and input into the second machine learning model. In an embodiment where intensity information is input into the model, a difference in intensities may be input into the second machine learning model of the present intensities relative to the prior intensities, as changes to intensity over time may be informative of a certain classification. In an embodiment, the diagnosis may include a classification for each biomarker of a given tooth.

While the disclosure herein refers to human patients, patients may be non-human. Canines, horses, and the like may have tooth decay using the systems and methods disclosed herein. For example, training data may be populated for animal teeth to train animal-specific machine learning model(s) to perform condition diagnosis. The machine learning models may, in an embodiment, be trained using cross-species training data. Truth in any of these training sets may be based on one or more of outcome from treatment, pain, and clinician labeling.

(b) Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for diagnosing a dental condition, the method comprising:
    capturing image data representative of a tooth of a patient based on data obtained from a hardware device that scans the tooth, wherein the image data obtained from the hardware device that scans the tooth comprises Deep Penetration Optical Coherence Tomography (DPOCT) data, and wherein the image data comprises an intensity map reflective of one or more optical properties of the tooth based on the DPOCT data;
    inputting the image data into a first supervised machine learning model, wherein the first supervised machine learning model is trained to detect changes in intensity between regions in the intensity map and to output respective classifications for each different location of the tooth based on the changes in intensity, each respective classification forming a biomarker, wherein the first supervised machine learning model additionally takes as input a color image of the tooth, and wherein the first supervised machine learning model is additionally trained to output biomarkers based on both the color image and the intensity map, the output of the first machine learning model excluding color data from the color image;
    receiving, as output from the first supervised machine learning model, a plurality of biomarkers, each biomarker corresponding to a different location of the tooth;
    inputting the plurality of biomarkers into a second supervised machine learning model; and
    receiving, as output from the second supervised machine learning model, a diagnosis of a dental condition.

2. The method of claim 1, the method further comprising accessing historical biomarkers of the tooth, wherein the historical biomarkers are input with the plurality of biomarkers into the second supervised machine learning model, and wherein the second supervised machine learning model outputs the diagnosis on the basis of both the historical biomarkers and the plurality of biomarkers.

3. The method of claim 2, wherein inputting the historical biomarkers with the plurality of biomarkers into the second supervised machine learning model comprises computing an intensity difference for each biomarker of the plurality of biomarkers relative to the historical biomarkers and inputting each intensity difference into the second supervised machine learning model.

4. The method of claim 1, wherein receiving, as output from the second supervised machine learning model, the diagnosis of the dental condition comprises receiving a plurality of diagnoses, each diagnosis of the plurality of diagnoses corresponding to a different one of the plurality of biomarkers.

5. A non-transitory computer-readable medium comprising memory with instructions encoded thereon for diagnosing a dental condition, the instructions, when executed, causing one or more processors to perform operations, the instructions comprising instructions to:
    capture image data representative of a tooth of a patient based on data obtained from a hardware device that scans the tooth, wherein the image data obtained from the hardware device that scans the tooth comprises Deep Penetration Optical Coherence Tomography (DPOCT) data, and wherein the image data comprises an intensity map reflective of one or more optical properties of the tooth based on the DPOCT data;
    input the image data into a first supervised machine learning model, wherein the first supervised machine learning model is trained to detect changes in intensity between regions in the intensity map and to output respective classifications for each different location of the tooth based on the changes in intensity, each respective classification forming a biomarker, wherein the first supervised machine learning model additionally takes as input a color image of the tooth, and wherein the first supervised machine learning model is additionally trained to output biomarkers based on both the color image and the intensity map, the output of the first machine learning model excluding color data from the color image;
    receive, as output from the first supervised machine learning model, a plurality of biomarkers, each biomarker corresponding to a different location of the tooth;
    input the plurality of biomarkers into a second supervised machine learning model; and
    receive, as output from the second supervised machine learning model, a diagnosis of a dental condition.

6. The non-transitory computer-readable medium of claim 5, the instructions further comprise instructions to access historical biomarkers of the tooth, wherein the historical biomarkers are input with the plurality of biomarkers into the second supervised machine learning model, and wherein the second supervised machine learning model outputs the diagnosis on the basis of both the historical biomarkers and the plurality of biomarkers.

7. The non-transitory computer-readable medium of claim 6, wherein the instructions to input the historical biomarkers with the plurality of biomarkers into the second supervised machine learning model comprise instructions to compute an intensity difference for each biomarker of the plurality of biomarkers relative to the historical biomarkers and inputting each intensity difference into the second supervised machine learning model.

8. The non-transitory computer-readable medium of claim 5, wherein the instructions to receive, as output from the second supervised machine learning model, the diagnosis of the dental condition comprise instructions to receive a plurality of diagnoses, each diagnosis of the plurality of diagnoses corresponding to a different one of the plurality of biomarkers.

9. A system comprising:
 memory with instructions encoded thereon for diagnosing a dental condition; and
 one or more processors that, when executing the instructions, are caused to perform operations comprising:
  capturing image data representative of a tooth of a patient based on data obtained from a hardware device that scans the tooth, wherein the image data obtained from the hardware device that scans the tooth comprises Deep Penetration Optical Coherence Tomography (DPOCT) data, and wherein the image data comprises an intensity map reflective of one or more optical properties of the tooth based on the DPOCT data;
  inputting the image data into a first supervised machine learning model, wherein the first supervised machine learning model is trained to detect changes in intensity between regions in the intensity map and to output respective classifications for each different location of the tooth based on the changes in intensity, each respective classification forming a biomarker, wherein the first supervised machine learning model additionally takes as input a color image of the tooth, and wherein the first supervised machine learning model is additionally trained to output biomarkers based on both the color image and the intensity map, the output of the first machine learning model excluding color data from the color image;
  receiving, as output from the first supervised machine learning model, a plurality of biomarkers, each biomarker corresponding to a different location of the tooth;
  inputting the plurality of biomarkers into a second supervised machine learning model; and
  receiving, as output from the second supervised machine learning model, a diagnosis of a dental condition.

10. The system of claim 9, the operations further comprising accessing historical biomarkers of the tooth, wherein the historical biomarkers are input with the plurality of biomarkers into the second supervised machine learning model, and wherein the second supervised machine learning model outputs the diagnosis on the basis of both the historical biomarkers and the plurality of biomarkers.

11. The system of claim 10, wherein inputting the historical biomarkers with the plurality of biomarkers into the second supervised machine learning model comprises computing an intensity difference for each biomarker of the plurality of biomarkers relative to the historical biomarkers and inputting each intensity difference into the second supervised machine learning model.

* * * * *